US008350781B2

(12) United States Patent
Hunt

(10) Patent No.: US 8,350,781 B2
(45) Date of Patent: Jan. 8, 2013

(54) MULTILAYER CONTROL OF GOBO SHAPE

(75) Inventor: Mark A Hunt, Derby (GB)

(73) Assignee: Production Resource Group, LLC, New Windsor, NY (US)

( * ) Notice: Subject to any disclaimer, the term of this patent is extended or adjusted under 35 U.S.C. 154(b) by 1053 days.

(21) Appl. No.: 12/265,651

(22) Filed: Nov. 5, 2008

(65) Prior Publication Data

US 2009/0059176 A1 Mar. 5, 2009

Related U.S. Application Data

(60) Continuation of application No. 11/129,692, filed on May 13, 2005, now Pat. No. 7,511,724, which is a division of application No. 09/668,824, filed on Sep. 22, 2000, now Pat. No. 7,161,562.

(60) Provisional application No. 60/155,513, filed on Sep. 22, 1999.

(51) Int. Cl.
*G09G 3/00* (2006.01)
*G02B 26/00* (2006.01)

(52) U.S. Cl. ........................................ 345/32; 359/291

(58) Field of Classification Search .......... 359/290–320; 345/30–32, 204–215, 690–699
See application file for complete search history.

(56) References Cited

U.S. PATENT DOCUMENTS

| | | | | |
|---|---|---|---|---|
| 4,894,760 | A * | 1/1990 | Callahan | 362/293 |
| 5,307,295 | A * | 4/1994 | Taylor et al. | 703/1 |
| 5,402,326 | A * | 3/1995 | Belliveau | 362/284 |
| 5,767,828 | A | 6/1998 | McKnight | |
| 5,828,485 | A * | 10/1998 | Hewlett | 359/291 |
| 5,835,087 | A * | 11/1998 | Herz et al. | 715/810 |
| 5,956,015 | A | 9/1999 | Hino | |
| 5,988,817 | A * | 11/1999 | Mizushima et al. | 353/94 |
| 6,081,383 | A * | 6/2000 | Tannemyr et al. | 359/634 |
| 6,220,730 | B1 * | 4/2001 | Hewlett et al. | 362/297 |
| 6,390,586 | B1 | 5/2002 | Takahashi et al. | |
| 6,445,505 | B1 | 9/2002 | Morgan | |
| 6,453,067 | B1 | 9/2002 | Morgan et al. | |
| 6,538,797 | B1 * | 3/2003 | Hunt | 359/291 |
| 6,771,411 | B2 * | 8/2004 | Hewlett | 359/298 |
| 7,161,562 | B1 * | 1/2007 | Hunt | 345/32 |
| 7,350,941 | B2 * | 4/2008 | Hunt | 362/321 |
| 7,511,724 | B2 * | 3/2009 | Hunt | 345/690 |
| 7,641,347 | B2 * | 1/2010 | Hunt | 353/97 |

* cited by examiner

*Primary Examiner* — Alexander Eisen
*Assistant Examiner* — Patrick F Marinelli
(74) *Attorney, Agent, or Firm* — Law Office of Scott C. Harris, Inc.

(57) ABSTRACT

A control of gobos defend by records in the gobo. The gobos are formed by menued shapes.

15 Claims, 11 Drawing Sheets

MULTILAYER CONTROL OF GOBO SHAPE

CROSS-REFERENCE TO RELATED APPLICATIONS

This application is a divisional application of and claims priority to U.S. patent application Ser. No. 09/668,824, filed Sep. 22, 2000, which claims the benefit of U.S. Provisional Application No. 60/155,513, filed Sep. 22, 1999.

FIELD

The present invention relates to a system of controlling light beam pattern ("gobo") shape in a pixilated gobo control system using a multilayer control.

BACKGROUND

The prior art describes a stage lighting system which operates based on computer-provided commands to form special effects. One of those effects is control of the shape of a light pattern that is transmitted by the device. This control is carried out on a pixel-by-pixel basis, hence referred to in this specification as pixilated. Control is also carried out using an x-y controllable device. The embodiment describes using a digital mirror device, but other x-y controllable devices such as a grating light valve, are also contemplated.

The computer controlled system includes a digital signal processor which is used to create an image command. That image command controls the pixels of the x-y controllable device to shape the light that it is output from the device.

The system described in the above-referenced application allows unparalleled flexibility in selection of gobo shapes and movement. This opens an entirely new science of controlling gobos.

SUMMARY

The present disclosure defines communicating with an x-y controllable device to form special electronic light pattern shapes. More specifically, the present application describes different aspects of communication with an electronic gobo. These aspects include improved processing or improved controls for the gobo and various ways of forming the user interface for such a device.

The present specification discloses controlling gobos based on layers. A complex light passing outline is defined by a number of different layers, each of which includes some number of items for the gobo.

BRIEF DESCRIPTION OF THE DRAWINGS

These and other aspects of the invention will now be described with reference to the attached drawings, in which.

DESCRIPTION OF THE PREFERRED EMBODIMENT

Figure 1:
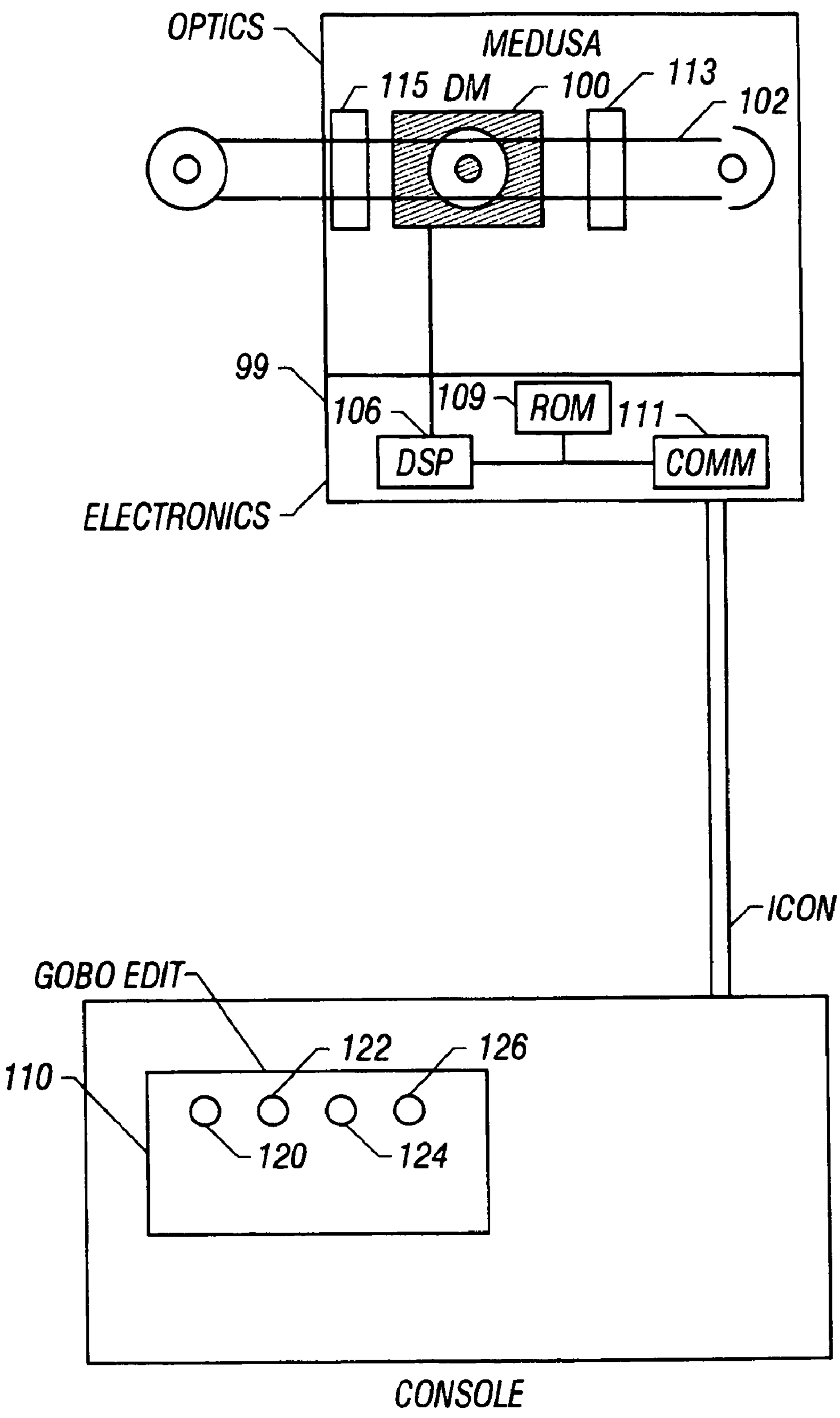
FIG. 1 shows a block diagram of the basic system operating the embodiment.

FIG. 1 shows a block diagram of the hardware used according to the preferred embodiment. As described above, this system uses a digital mirror device 100, which has also been called a digital mirror device ("DMD") and a digital light processor device ("DLP"). More generally, any system which allows controlling shape of light on a pixel basis, including a grating light valve, could be used as the light shaper. This light shaper forms the shape of light which is transmitted. FIG. 1 shows the light being transmitted as 102, and shows the transmitted light. The information for the digital mirror 100 is calculated by a digital signal processor 106. Information is calculated based on local information stored in the lamp, e.g., in ROM 109, and also in information which is received from the console 104 over the communication link.

The operation is commanded according to a format.

The preferred data format provides 4 bytes for each of color and gobo control information.

The most significant byte of gobo control data, ("dfGobo") indicates the gobo type. Many different gobo types are possible. Once a type is defined, the gobo formed from that type is represented by a number. That type can be edited using a special gobo editor described herein. The gobo editor allows the information to be modified in new ways, and forms new kinds of images and effects.

The images which are used to form the gobos may have variable and/or moving parts. The operator can control certain aspects of these parts from the console via the gobo control information. The type of gobo controls the gobo editor to allow certain parameters to be edited.

The examples given below are only exemplary of the types of gobo shapes that can be controlled, and the controls that are possible when using those gobo shapes. Of course, other controls of other shapes are possible and predictable based on this disclosure.

First Embodiment

A first embodiment is the control of an annulus, or "ring" gobo. The DMD 100 in FIG. 1 is shown with the ring gobo being formed on the DMD. The ring gobo is type 000A. When the gobo type 0A is enabled, the gobo editor 110 on the console 104 is enabled and the existing gobo encoders 120, 122, 124, and 126 are used. The gobo editor 110 provides the operator with specialized control over the internal and the external diameters of the annulus, using separate controls in the gobo editor.

The gobo editor and control system also provides other capabilities, including the capability of timed moves between different edited parameters. For example, the ring forming the gobo could be controlled to be thicker. The operation could then effect a timed move between these "preset" ring thicknesses. Control like this cannot even be attempted with conventional fixtures.

Another embodiment is a composite gobo with moving parts. These parts can move though any path that are programmed in the gobo data itself. This is done in response to the variant fields in the gobo control record, again with timing. Multiple parts can be linked to a single control allowing almost unlimited effects.

Another embodiment of this system adapts the effect for an "eye" gobo, where the pupil of the eye changes its position (look left, look right) in response to the control.

Yet another example is a Polygon record which can be used for forming a triangle or some other polygonal shape.

The control can be likened to the slider control under a QuickTime movie window, which allows you to manually move to any point in the movie. However, our controls need not be restricted to timelines.

Even though such moving parts are used, scaling and rotation on the gobo is also possible.

The following type assignments are contemplated:
00__0F=FixedGobo (with no "moving parts")
10__1F=SingleCntrl (with 1 "moving part")
20__2F=DoubleCntrl (with 2 "moving parts")
30_FF=undefined, reserved.

The remaining control record bytes for each type are defined as follows:

| Byte: | dfGobo2 | dfGobo3 | dfGobo4 | #gobos/ type, | total memory |
|---|---|---|---|---|---|
| FixedGobo: | ID[23:16] | ID[15:8] | ID[7:0] | 16M/type | 256M |
| SingleCntrl: | ID[15:8] | ID[7:0] | control#1 | 64k/type | 1M |
| DoubleCntrl: | ID[7:0] | control#2 | control#1 | 256/type | 4k |

As can be seen from this example, this use of the control record to carry control values does restrict the number of gobos which can be defined of that type, especially for the 2-control type.

Console Support:

The use of variant part gobos requires no modifications to existing console software for the ICON (7M) console. The Gobo editor in current ICON software already provides 4 separate encoders for each gobo. These translate directly to the values of the 4 bytes sent in the communications data packet as follows:

| Byte: | dfGobo | dfGobo2 | dfGobo3dfGobo4 |
|---|---|---|---|
| Enc: | TopRight | MidRight | BotRightBotLeft |
| FixedGobo: | ID[23:16] | ID[15:8] | ID[7:0] |
| SingleCntrl: | ID[15:8] | ID[7 0] | control#1 |
| DoubleCntrl: | ID[7:0] | control#2 | control#1 |

These values would be part of a preset gobo, which could be copied as the starting point.

Once these values are set, the third and fourth channels automatically become the inner/outer radius controls. Using two radii allows the annulus to be turned "inside out".

Each control channel's data always has the same meaning within the console. The console treats these values as simply numbers that are passed on. The meanings of those numbers, as interpreted by the lamps change according to the value in dfGobo.

The lamp will always receives all 4 bytes of the gobo data in the same packet. Therefore, a "DoubleCntrl" gobo will always have the correct control values packed along with it.

Hence, the console needs no real modification. If a "soft" console is used, then name reassignments and/or key reassignments may be desirable.

Timing:

For each data packet, there is an associated "Time" for gobo response. This is conventionally taken as the time allotted to place the new gobo in the light gate. This delay has been caused by motor timing. In this system, variant gobo, the control is more dynamically used. If the non-variant parts of the gobo remain the same, then it is still the same gobo, only with control changes. Then, the time value is interpreted as the time allowed for the control change.

Since different gobo presets (in the console) can reference the same gobo, but with different control settings, this allows easily programmed timed moves between different annuli, etc.

Internal Workings:

When the gobo command data is extracted from the packet at the lamp, the dfGobo byte is inspected first, to see if either dfGobo3 or dfGobo4 are significant in selecting the image. In the case of the "Cntrl" variants, one or both of these bytes is masked out, and the resulting 32-bit number is used to search for a matching gobo image (by Gobo__1D) in the library stored in the lamp's ROM 109.

If a matching image is found, and the image is not already in use, then the following steps are taken:

1) The image data is copied into RAM, so that its fields may be modified by the control values. This step will be skipped if the image is currently active.

2) The initial control values are then recovered from the data packet, and used to modify certain fields of the image data, according to the control records.

3) The image is drawn on the display device, using the newly-modified fields in the image data.

If the image is already in use, then the RAM copy is not altered. Instead, a time-sliced task is set up to slew from the existing control values to those in the new data packet, in a time determined by the new data packet.

At each vertical retrace of the display, new control values are computed, and steps 2 (using the new control values) and 3 above are repeated, so that the image appears modified with time.

The Image Data Records:

All images stored in the lamp are in a variant record format:
Header:
Length 32 bits, offset to next gobo in list.
Gobo__1D 32 bits, serial number of gobo.
Gobo Records:

| | |
|---|---|
| Length | 32 bits, offset to next record. |
| Opcode | 16 bits, type of object to be drawn. |
| Data | Variant part - data describing object. |
| __Length | 32 bits, offset to next record. |
| Opcode | 16 bits, type of object to be drawn. |
| Data | Variant part - data describing object. |

_EndMarker 64 bits, all zeroes—indicates end of gobo data.
+ Next gobo, or End Marker, indicating end of gobo list.

Gobos with controls are exactly the same, except that they contain control records, which describe how the control values are to affect the gobo data. Each control record contains the usual length and Opcode fields, and a field containing the control number (1 or 2).

These are followed by a list of "field modification" records. Each record contains information about the offset (from the start of the gobo data) of the field, the size (8, 16 or 32 bits) of the field, and how its value depends on the control value.

| | |
|---|---|
| Length | 32 bits, offset to next record |
| Opcode | 16 bits = control__record (constant) |

-continued

| | |
|---|---|
| CntrlNum | 16 bits = 1 or 2 (control number) |
| | /* field modification record #1 */ |
| Address | 16 bits, offset from start of gobo to affected field. |
| Flags | 16 bits, information about field (size, signed, etc) |
| Scale | 16 bits, scale factor applied to control before use |
| zPoint | 16 bits, added to control value after scaling. |
| | /* field modification record #2 */ |
| Address | 16 bits, offset from start of gobo to affected field. |
| Flags | 16 bits, information about field (size, signed, etc) |
| Scale | 16 bits, scale factor applied to control before use |
| zPoint | 16 bits, added to control value after scaling. |

As can be seen, a single control can have almost unlimited effects on the gobo, since ANY values in the data can be modified in any way, and the number of field modification records is almost unlimited.

Note that since the control records are part of the gobo data itself, they can have intimate knowledge of the gobo structure. This makes the hard-coding of field offsets acceptable.

In cases where the power offered by this simple structure is not sufficient, a control record could be defined which contains code to be executed by the processor. This code would be passed parameters, such as the address of the gobo data, and the value of the control being adjusted.

Example Records

The Annulus record has the following format:

| | |
|---|---|
| Length | 32 bits |
| Opcode | 16 bits, = type_annulus |
| Pad | 16 bits, unused |
| Centre_x | 16 bits, x coordinate of centre |
| Centre_y | 16 bits, y coordinate of centre |
| OuterRad | 16 bits, outside radius (the radii get swapped when drawn if their values are in the wrong order) |
| InnerRad | 16 bits, inside radius |

It can be seen from this that it is easy to "target" one of the radius parameters from a control record. Use of two control records, each with one of the radii as a target, would provide full control aver the annulus shape.

Note that if the center point coordinates are modified, the annulus will move around the display area, independent of any other drawing elements in the same gobo's data.

The Polygon record for a triangle has this format:

| | |
|---|---|
| Length | 32 bits |
| Opcode | 16 bits, = type_polygon |
| Pad | 16 bits, vertex count = 3 |
| Centre_x | 16 bits, x coordinate of vertex |
| Centre_y | 16 bits, y coordinate of vertex |
| Centre_x | 16 bits, x coordinate of vertex |
| Centre_y | 16 bits, y coordinate of vertex |
| Centre_x | 16 bits, x coordinate of vertex |
| Centre_y | 16 bits, y coordinate of vertex |

It is easy to modify any of the vertex coordinates, producing distortion of the triangle.

The gobo data can contain commands to modify the drawing environment, by rotation, scaling, offset, and color control, the power of the control records is limitless.

Second Embodiment

This second embodiment provides further detail about implementation once the gobo information is received.

Figure 2:
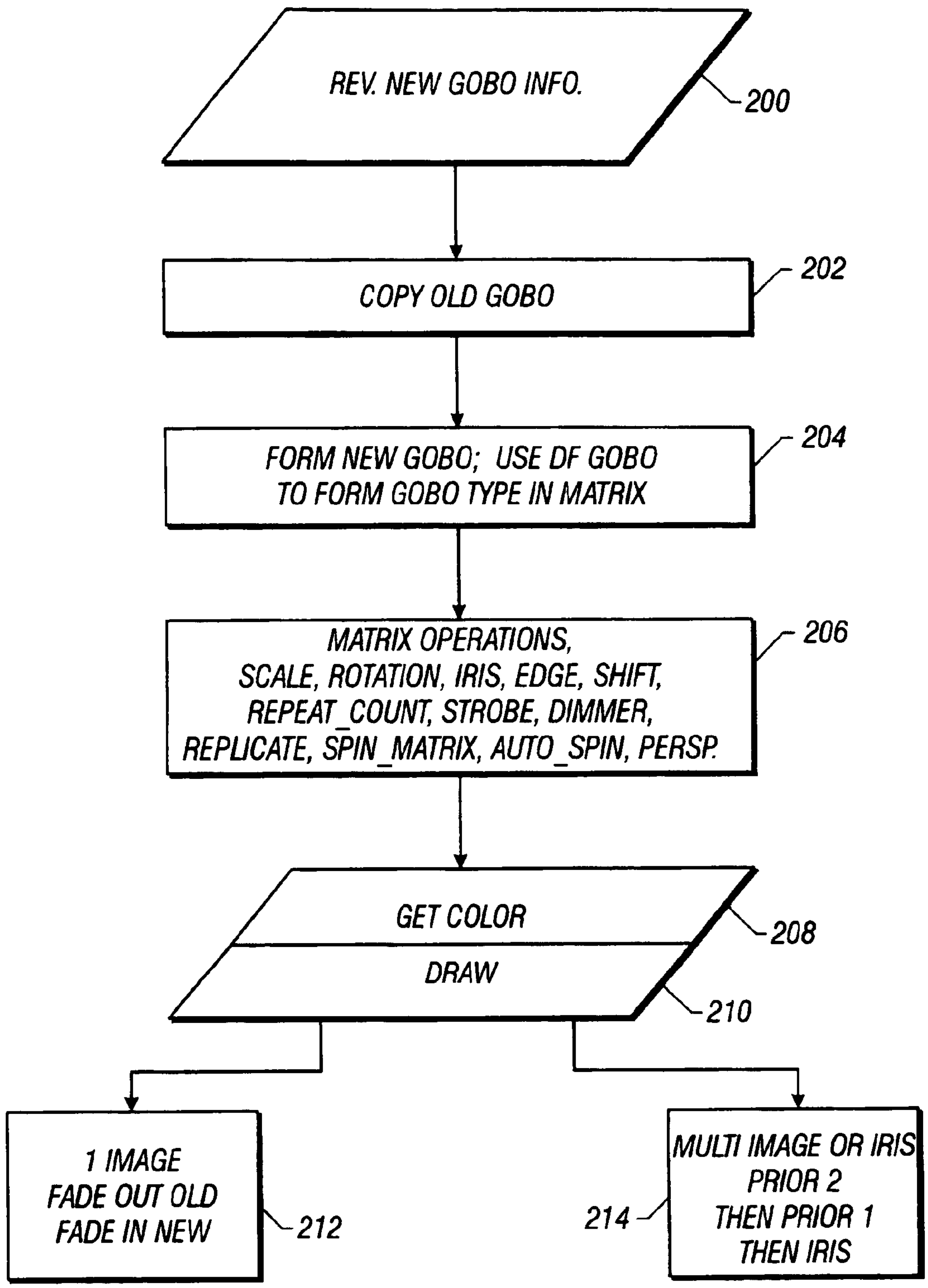
FIG. 2 shows a basic flowchart of operation.

Gobo information is, at times, being continuously calculated by DSP 106. The flowchart of FIG. 2 shows the handling operation that is carried out when new gobo information is received.

At step 200, the system receives new gobo information. In the preferred embodiment, this is done by using a communications device 111 in the lamp 99. The communications device is a mailbox which indicates when new mail is received. Hence, the new gobo information is received at step 200 by determining that new mail has been received.

At step 202, the system copies the old gobo and switches pointers. The operation continues using the old gobo until the draw routine is called later on.

At step 204, the new information is used to form a new gobo. The system uses a defined gobo ("dfGobo") as discussed previously which has a defined matrix. The type dfGobo is used to read the contents from the memory 109 and thereby form a default image. That default image is formed in a matrix. For example, in the case of an annulus, a default size annulus can be formed at position 0,0 in the matrix. An example of forming filled balls is provided herein.

Step 206 represents calls to subroutines. The default gobo is in the matrix, but the power of this system is its ability to very easily change the characteristics of that default gobo. In this embodiment, the characteristics are changed by changing the characteristics of the matrix and hence, shifting that default gobo in different ways. The matrix operations, which are described in further detail herein, include scaling the gobo, rotation, iris, edge, strobe, and dimmer. Other matrix operations are possible. Each of these matrix operations takes the default gobo, and does something to it.

For example, scale changes the size of the default gobo.** Rotation rotates the default gobo by a certain amount. Iris simulates an iris operation by choosing an area of interest, typically circular, and erasing everything outside that area of interest. This is very easily done in the matrix, since it simply defines a portion in the matrix where all black is written.

Edge effects carry out certain effects on the edge such as softening the edge. This determines a predetermined thickness, which is translated to a predetermined number of pixels, and carries out a predetermined operation on the number of pixels. For example, for a 50% edge softening, every other pixel can be turned off. The strobe is in effect that allows all pixels to be turned on and off at a predetermined frequency, i.e., 3 to 10 times a second. The dimmer allows the image to be made dimmer by turning off some of the pixels at predetermined times.

The replicate command forms another default gobo, to allow two different gobos to be handled by the same record. This will be shown with reference to the exemplary third embodiment showing balls. Each of those gobos are then handled as the same unit and the entirety of the gobos can be, for example, rotated. The result of step 206 and all of these subroutines that are called is that the matrix includes information about the bits to be mapped to the digital mirror 100.

At step 208, the system then obtains the color of the gobos from the control record discussed previously. This gobo color is used to set the appropriate color changing circuitry 113 and 115 in the lamp 99. Note that the color changing circuitry is shown both before and after the digital mirror 100. It should be understood that either of those color changing circuits could be used by itself.

At step 210, the system calls the draw routine in which the matrix is mapped to the digital mirror. This is done in different ways depending on the number of images being used. Step 212 shows the draw routine for a single image being used as the gobo. In that case, the old gobo, now copied as shown in step 202, is faded out while the new gobo newly calculated is faded in. Pointers are again changed so that the system points to the new gobo. Hence, this has the effect of automatically fading out the old gobo and fading in the new gobo.

Step 214 schematically shows the draw routine for a system with multiple images for an iris. In that system, one of the gobos is given priority over the other. If one is brighter than the other, then that one is automatically given priority. The one with priority 2, the lower priority 1, is written first. Then the higher priority gobo is written. Finally, the iris is written which is essentially drawing black around the edges of the screen defined by the iris. Note that unlike a conventional iris, this iris can take on many different shapes. The iris can take on not just a circular shape, but also an elliptical shape, a rectangular shape, or a polygonal shape. In addition, the iris can rotate when it is non-circular so that for the example of a square iris, the edges of the square can actually rotate.

Returning to step 206, in the case of a replicate, there are multiple gobos in the matrix. This allows the option of spinning the entire matrix, shown as thin matrix.

Figure 4A:
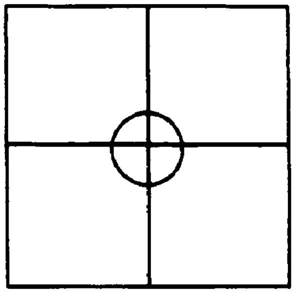
FIGS. 4A through 4G show respective interim results of carrying out the replicating circles operation.

An example will now be described with reference to the case of repeating circles. At step 200, the new gobo information is received indicating a circle. This is followed by the other steps of 202 where the old gobo is copied, and 204 where the new gobo is formed. The specific operation forms a new gobo at step 300 by creating a circle of size diameter equals 1000 pixels at origin 00. This default circle is automatically created. FIG. 4A shows the default gobo which is created, a default size circle at 00. It is assumed for purposes of this operation that all of the circles will be the same size.

Figure 3:
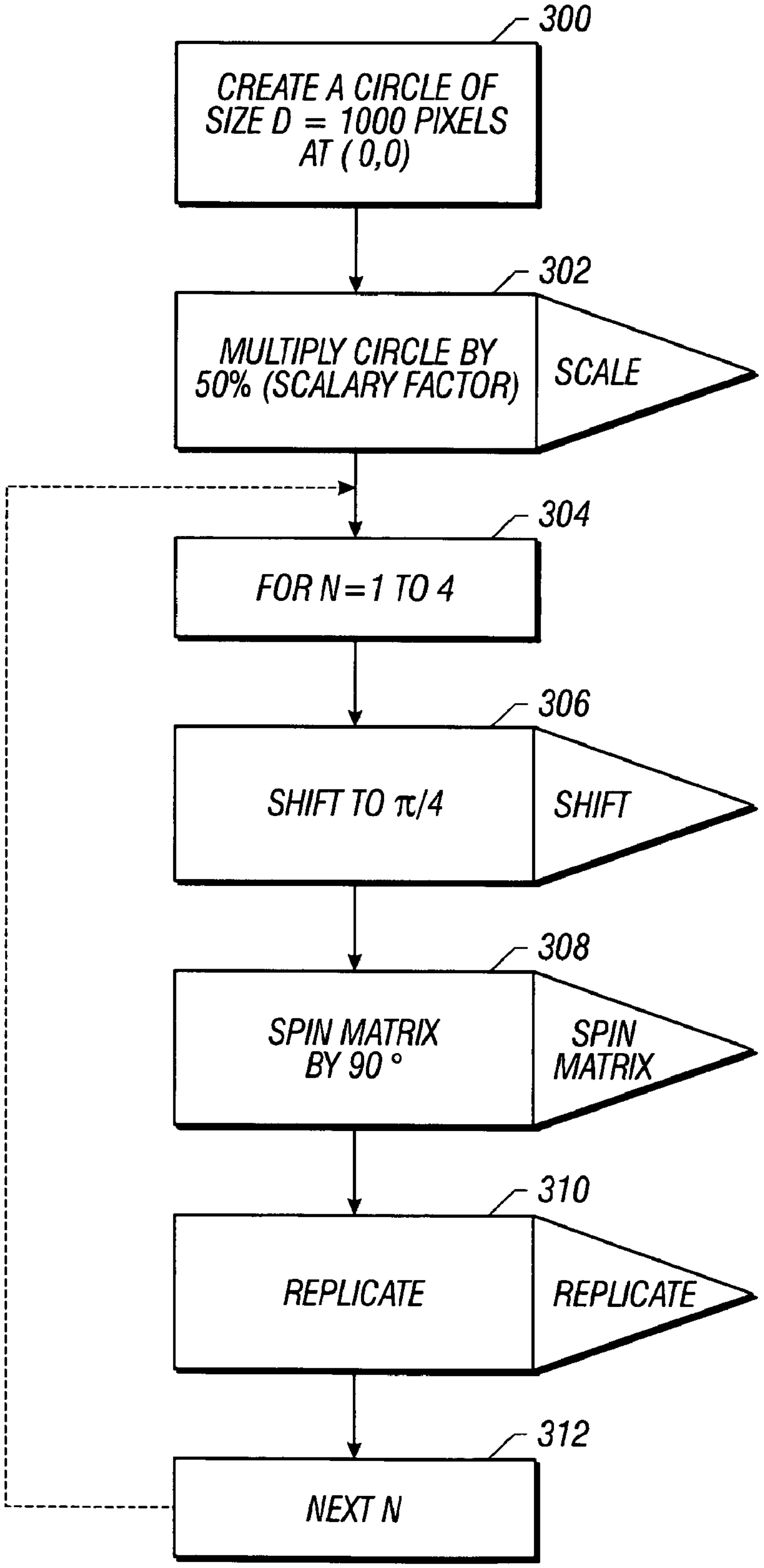
FIG. 3 shows a flowchart of forming a replicating circles type gobo.
Figure 4B:
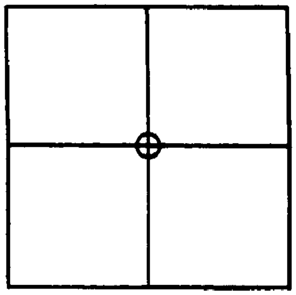
Figure 4C:
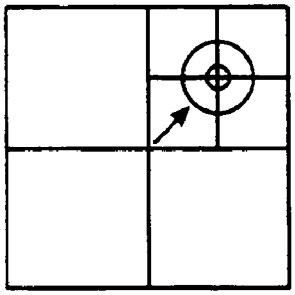
Figure 4D:
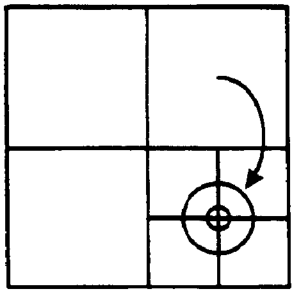

At step 302, the circle is scaled by multiplying the entire circle by an appropriate scaling factor. Here, for simplicity, we are assuming a scaling factor of 50% to create a smaller circle. The result is shown in FIG. 4B. A gobo half the size of the gobo of FIG. 4A is still at the origin. This is actually the scale of the subroutine as shown in the right portion of step 302. Next, since there will be four repeated gobos in this example, a four-loop is formed to form each of the gobos at step 304. Each of the gobos is shifted in position by calling the matrix operator shift. In this example, the gobo is shifted to a quadrant to the upper right of the origin. This position is referred to as π over 4 in the FIG. 3 flowchart and results in the gobo being shifted to the center portion of the top right quadrant as shown in FIG. 4C. This is again easily accomplished within the matrix by moving the appropriate values. At step 308, the matrix is spun by 90 degrees in order to put the gobo in the next quadrant as shown in FIG. 4D in preparation for the new gobo being formed into the same quadrant. Now the system is ready for the next gobo, thereby calling the replicate command which quite easily creates another default gobo circle and scales it. The four-loop is then continued at step 312.

Figure 4E:
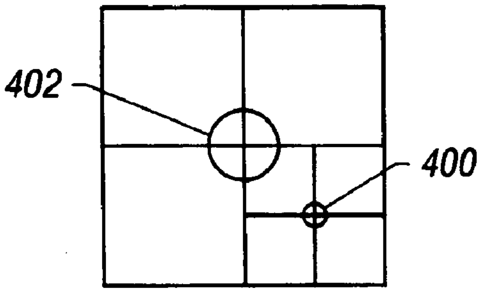
Figure 4F:
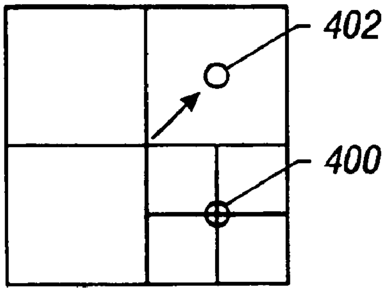
Figure 4G:
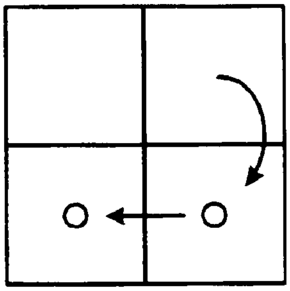

The replicate process is shown in FIG. 4E where a new gobo 402 is formed in addition to the existing gobo 400. The system then passes again through the four-loop, with the results being shown in the following figures. In FIG. 4F, the new gobo 402 is again moved to the upper right quadrant (step 306). In FIG. 4G, the matrix is again rotated to leave room for a new gobo in the upper right quadrant. This continues until the end of the four-loop. Hence, this allows each of the gobos to be formed.

Since all of this is done in matrix operation, it is easily programmable into the digital signal processor. While the above has given the example of a circle, it should be understood that this scaling and moving operation can be carried out for anything. The polygons, circles, annulus, and any other shape is easily scaled.

The same operation can be carried out with the multiple parameter gobos. For example, for the case of a ring, the variable takes the form annulus (inner R, outer R, x and y). This defines the annulus and turns of the inner radius, the outer radius, and x and y offsets from the origin. Again, as shown in step 3, the annulus is first written into the matrix as a default size, and then appropriately scaled and shifted. In terms of the previously described control, the ring gobo has two controls: control 1 and control 2 defined the inner and outer radius.

Each of these operations is also automatically carried out by the command repeat count which allows easily forming the multiple position gobo of FIGS. 4A-4G. The variable auto spin defines a continuous spin operation. The spin operation commands the digital signal processor to continuously spin the entire matrix by a certain amount each time.

Figure 5:
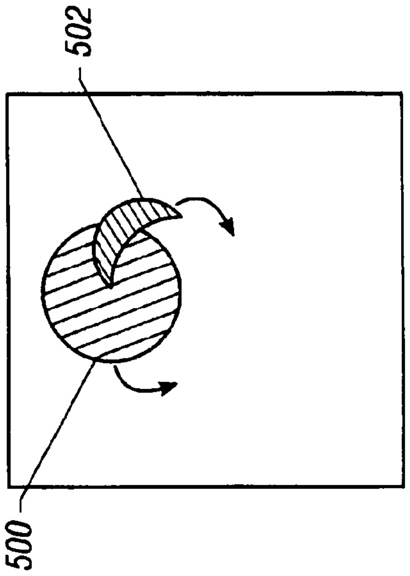
FIG. 5 shows the result of two overlapping gobos rotating in opposite directions.
Figure 6:
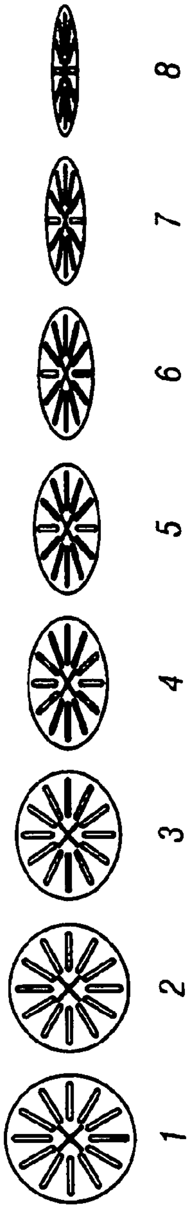
FIGS. 6(1) through 6(8) show a z-axis flipping gobo.

One particularly interesting feature available from the digital mirror device is the ability to use multiple gobos which can operate totally separately from one another raises the ability to have different gobos spinning in different directions. When the gobos overlap, the processor can also calculate relative brightness of the two gobos. In addition, one gobo can be brighter than the other. This raises the possibility of a system such as shown in FIG. 5. Two gobos are shown spinning in opposite directions: the circle gobo 500 is spinning the counterclockwise direction, while the half moon gobo 502 is spinning in the clockwise direction. At the overlap, the half moon gobo which is brighter than the circle gobo, is visible over the circle gobo. Such effects were simply not possible with previous systems. Any matrix operation is possible, and only a few of those matrix operations have been described herein.

A final matrix operation to be described is the perspective transformation. This defines rotation of the gobo in the Z axis and hence allows adding depth and perspective to the gobo. For each gobo for which rotation is desired, a calculation is preferably made in advance as to what the gobo will look like during the Z axis transformation. For example, when the gobo is flipping in the Z axis, the top goes back and looks smaller while the front comes forward and looks larger. FIGS. 5A-5C show the varying stages of the gobo flipping. In FIG. 5D, the gobo has its edge toward the user. This is shown in FIG. 5D as a very thin line, e.g., three pixels wide, although the gobo could be zero thickness at this point. Automatic algorithms are available for such Z axis transformation, or alternatively a specific Z axis transformation can be drawn and digitized automatically to enable a custom look.

Third Embodiment

The gobo record format described above can have two gobos therein. These two gobos can be gobo planes, which can be used to project one image superimposed over another image in a predefined way. For example, a first image can be a pattern that emits light, e.g., a standard gobo. The second image can be totally transparent, or can have holes through which the first image can be seen.

Analog gobos often project light through two gobos. The light is then projected through the intersection between the two gobos. Effectively, this takes an AND function between the gobos. Light will only be passed in places where both gobos are open.

In the present system, any function between two images can be projected as an overall gobo shape. The system can, e.g., project the "or" between the two images. Moreover, the two images can be projected in separate colors. Therefore, for example, the system used in FIGS. 7A-7B could be carried out in software.

Figure 7A:
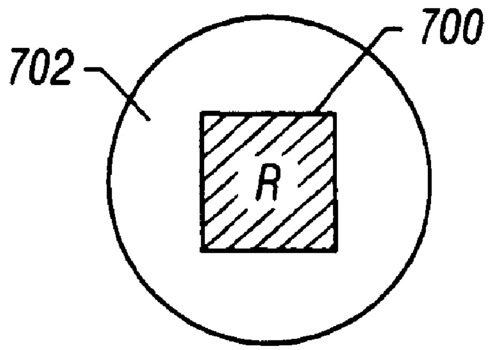
FIGS. 7A-7C show overlapping square gobos.
Figure 7B:
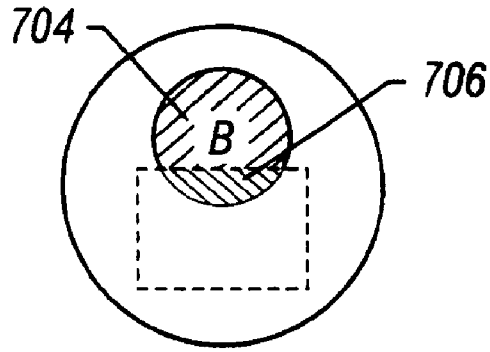
Figure 7C:
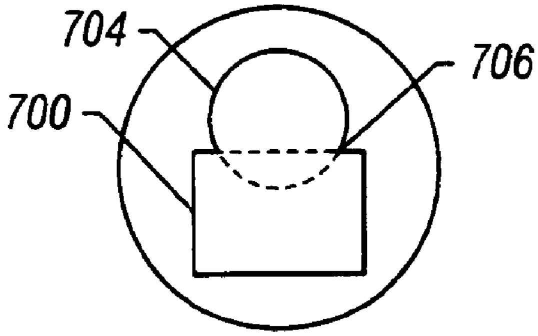

A first gobo shown in FIG. 7A is a square gobo. For purposes of this example, the square gobo is projected in red, forming a first lighted portion. The exterior non-projected portion 702 is black. FIG. 7B shows the second gobo to be added to the first gobo. The second gobo is an off-center circle 704 to be projected in blue. The AND between these two gobos would transmit only the intersection between the two gobos, shown by the hatched portion 706. Moreover, this portion could only be transmitted in the additive or subtractive combination between the two colors, red and blue.

The present system defines the two images as separate planes. This enables transmitting the "or" between the two images. Therefore, both the first image 700 and the second image 704 are transmitted. Moreover, the intersection portion of the image 706 can be made in any desired color, either the color of either, the color of the subtractive combination, or a totally different color while this system describes an "or" operation, it also encompasses any combination between the gobos: e.g., X or, Schmitt-triggered (hysteresis-induced) and/or, others.

The gobo operation is simplified and made more efficient by using a transfer controller as described herein.

Figure 8:
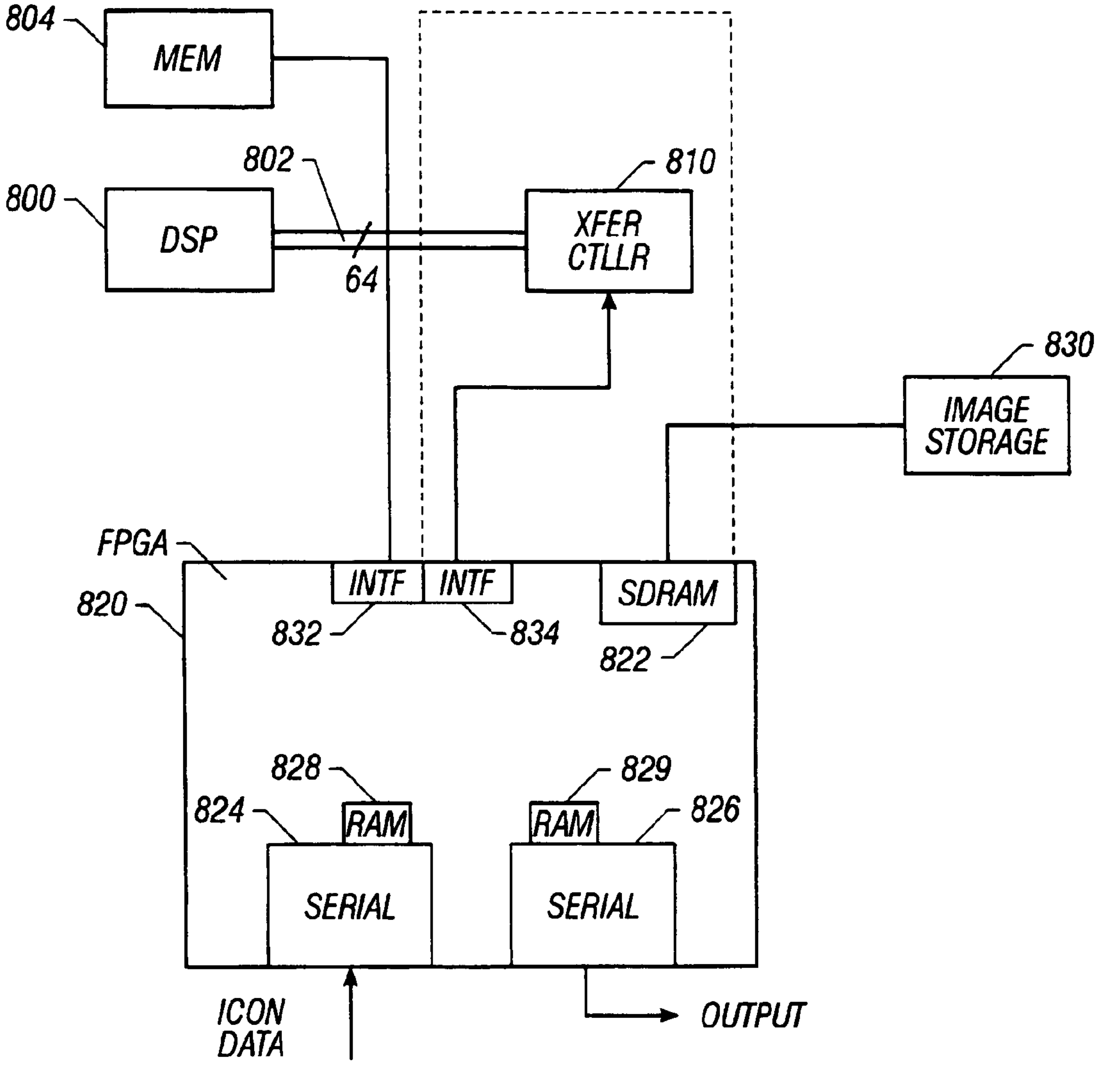
FIG. 8 shows the DSP for this operation.

FIG. 8 shows the basic block diagram of this embodiment. The Digital Signal Processor (DSP) 800 effectively functions as the central processing unit. The preferred DSP for this embodiment is the TI TMS 320C80. This includes a 64-bit bus 802. Memory 804 is attached to the bus 802. The memory 804 effectively forms a working portion. A transfer controller 810 is provided and allows increased speed. The transfer controller can take control of the bus and can carry out certain functions. One such function is a direct memory access. This allows moving information from the program memory 804 to a desired location. The transfer controller receives information about the data to be moved, including the start location of the data, the number of bytes of the date, and the end location of the data. The destination and operation is also specified by the data 809. The transfer controller 810 then takes the data directly from the memory 804, processes it, and returns it to the memory or to the DMP without DSP intervention. The CPU can then therefore tell the transfer controller to take some action and then can itself do something else.

Also on the bus 802 is a hardware block 820 which is preferably formed from a Field Programmable Gate Array (FPGA). The FPGA can be configured into logical blocks as shown. The DSP also sends commands that 807 reconfigure the FPGA as needed. The FPGA can be reconfigured to form fast Synchronous Dynamic Random Access Memory (SDRAM) shown as 822.

The preferred DSP 800 is a TI TMS 320C80. This device includes an associated transfer controller which is a combined memory controller and DMA (direct memory access) machine. It handles the movement of data and instructions within the system as required by the master processor, parallel processors, video controller, and external devices.

The transfer controller performs the following data-movement and memory-control functions:

MP and ADSP instruction-cache fills
MP data-cache fills and dirty-block write-back
MP and ADSP packet transfers (PTs)
Externally initiated packet transfers (XPTs)
VC packet transfers (VCPTs)
MP and ADSP direct external accesses (DEAs)
VC shift-register-transfer (SRTs)
DRAM refresh
sExternal bus requests Operations are performed on the cache sub-block as requested by the processors' internal cache controllers. DEA operations transfer off-chip data directly to or from processor registers. Packet transfers are the main data transfer operations and provide an extremely flexible method for moving multidimensional blocks of data (packets) between on-chip and/or off-chip memory.

Key features of the this specific transfer controller include:

Crossbar Interface
64-bit data path
Single-cycle access
External memory interface
4G-byte address range dynamically configurable memory cycles
Bus size of 8, 16, 32, or 64 bits
Selectable memory page size
Selectable row/column address multiplexing
Selectable cycle timing
Big or little indian operation Cache, VRAM, and refresh controller
Programmable refresh rate
VRAM block-write support
Independent source and destination addressing Autonomous address generation based on packet transfer parameters Data can be read and written at different rates Numerous data merging and spreading functions can be performed during transfers Intelligent request prioritization Hence, the transfer controller allows definition of the limits of the message/data, and then the information can be automatically handled. The transfer controller also can generate a table of end points, carry out direct-memory access, and manipulate the data while transferring the data.

The SDRAM 822 can be used as fast-image memory, and can be connected, for example, to an image storage memory 830. The FPGA can also be configured to include serial interfaces 824, 826 with their associated RAM 828, 829 respectively. Other hardware components can also be configured by the FPGA.

Since the FPGA can be reconfigured under control of the processor 800, the FPGA can be reconfigured dynamically to set an appropriate amount of SDRAM 822. For example, if a larger image or image processing area is necessary, the FPGA can be reconfigured to make more of it into image memory. If a smaller image is desired, less of the FPGA can be made into SDRAM, allowing more of the FGPA for other hardware functions. Moreover, the interfaces 832, 834 can be dynamically reconfigured. For example, the baud rate can be changed, bus width can be reconfigured, and the like.

The serial receiver 824 receives the ICON data from the controller, as described in our copending application, 7319/63. The serial driver 826 produces a serial output that can drive, for example, an RS422 bus that runs the motors.

Figure 11:
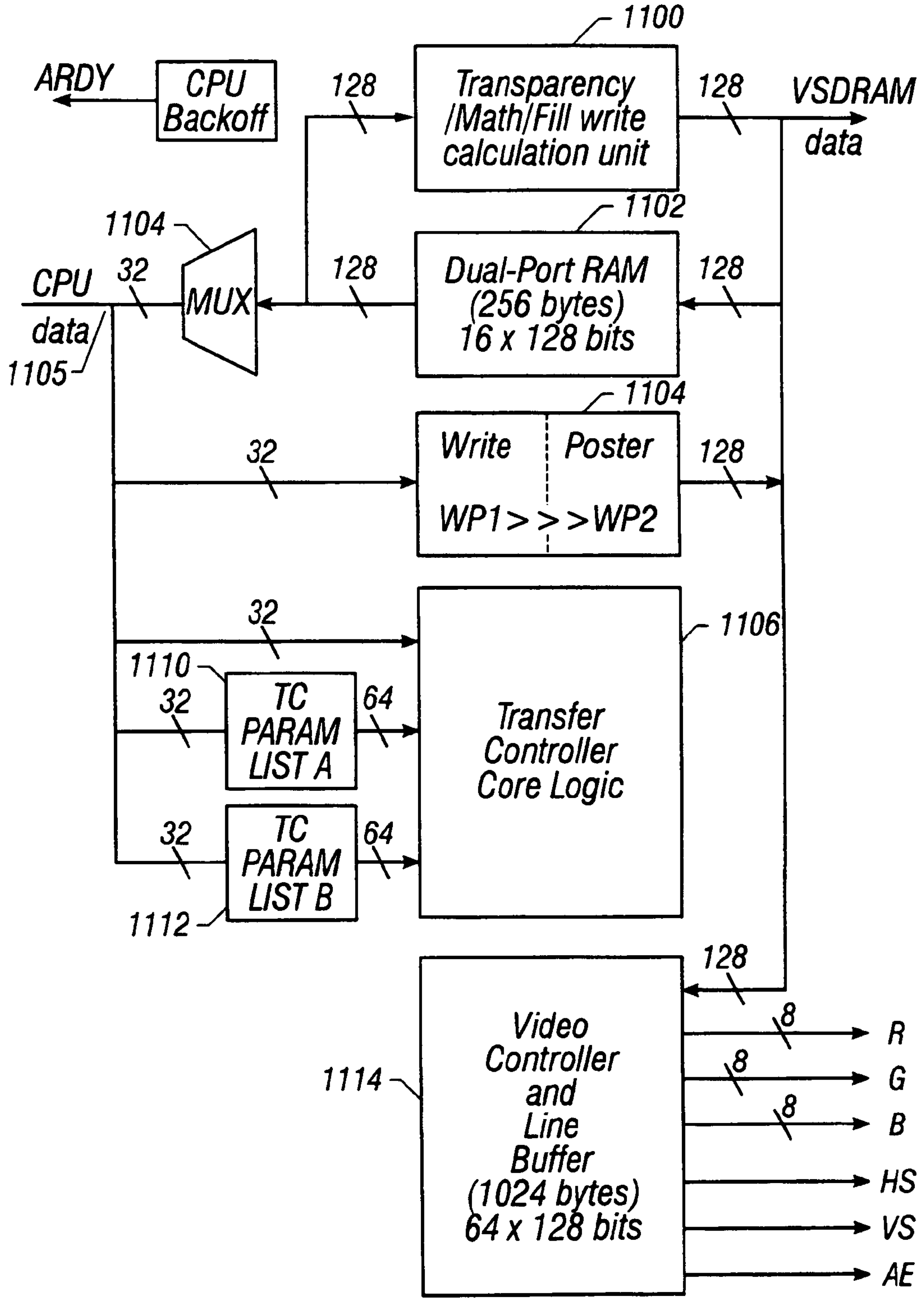
FIG. 11 shows a transfer controller.

The C80 DSP includes the transfer controller as a part thereof. An alternative embodiment uses a different DSP. The functions of the transfer controller are then replicated in the FPGA, as desired. For example, an alternative possible DSP is the C6201 which uses the Very Large Instruction Word "VLIW" architecture. This system can use, for example, 128-bit instructions. However, since this is connected to the 32-bit data bus, a transfer controller could be highly advantageous. This would enable the equivalent of direct memory access from the memory. FIG. 11 shows the gate array schematic of this alternate embodiment in which the transfer controller is part of the FPGA.

A second embodiment of the gate array logic, as preferably used according to the present system, is shown in FIG. 11. This gate array logic is formed in the field-programmable gate array and carries out many of the functions described herein. Block 1100 corresponds to a transparency device which calculates values associated with transparency. Block 1102 is a dual-port RAM which receives the VLIW at one port thereof, and outputs that value to a multiplexer 1104, which converts it to the 32 bits used by the CPU/DSP. The write poster 1104. Transfer controller 1106 has the functionality discussed above, and is controlled directly by the CPU data received on line 1105. The transfer controller can have two lists of parameters, each 64 bits in width. These values are received on the list receivers 1110, 1112.

Another issue noted by the current inventors is the size of images. If possible, it is desirable to avoid using uncompressed images. For example, one easy form image to manipulate is a bitmap, also known as a ".bmp" type image. The bitmap represents each pixel of the image by a number of bits, e.g., for an 8-bit 3-primary color image, each pixel would require 24 bits. This can, unfortunately, use incredible amounts of storage. However, since the bit map has a 1-to-1 correspondence with the image, it can be relatively easy to manipulate the bit map. For example, a matrix representing the bitmap can be easily manipulated, e.g., rotated. The image form can be compressed, e.g., to a GIF or JPEG image. This image, however, loses the one-to-one correspondence and hence cannot be directly processed as easily.

One aspect of the present system is to store the image as a compressed image, and most preferably as polygons. The existing software package, Adobe Streamline™, breaks a bitmap into multiple polygons. The polygons can then be defined as vectors. An additional advantage is that the vectors can be easily processed by the DSP. The DSP 800 then builds the image from the vectors. Since the image is defined as vectors, it can be easily related via matrix arithmetic. Using Adobe Streamline, for example, an 800 kilobyte bit map can be compressed to a 30 kilobyte vector image.

Another improvement of the present system is the control of the gobo using filters.

In an analog gobo system, a filter can be used to blur the image, for example. Many different kinds of filters are used. For example, some filters randomly distort the image. Other filters affect the image in different ways. The blurring can be carried out as an electronic filter. A preferred user interface defines the filter as a separate gobo that is multiplied, e.g., and ed OR ed with the first gobo.

More generally, a filter can be used to alter the image in some way, e.g., scaler the image, decay the image, or the like. The blur can be used to make the image apparently out of focus in some locations. The filter uses a second gobo that simulates the effect of an analog filter. For example, one operation simulates the optical effect of the glass that forms the filter in an analog gobo. That glass is used to make an algorithm that emulates the optical properties of the glass. Those optical properties are then pushed through the matrix representing the gobo, thereby effecting a digital representation of the filter. In one aspect, the filter is considered as a separate gobo which is OR ed with the second gobo. In this case, the dual gobo definition described above can be used. Alternatively, the filter can simply be added to the gobo-defining matrix.

This definition has the advantage that it avoids defining a totally separate control. The filters are each defined as one specific gobo. There is already a manual that defines gobos. This manual has filters added to it. This avoids the need for a manual of filters.

Another aspect defined by the present system is gobos that load and execute code. Some images cannot be described in terms of control. For example, images may be defined as some random input. Some images progress with time and maintain no record of their previous state. These images are easily defined in terms of code and in terms of a progression from one time to another. Hence, the gobos that load and execute code define a gobo that includes an associated area to hold static values. A gobo is requested and the code and variables that are associated with that gobo are copied into RAM. The variables are initially at a preset state. The code that is in the gobo portion is executed, using the portions in the variables. The variables are modified at each pass through the portion.

Yet another feature of this system is intensity control over aspects of the image defining the gobo and dimming of the image defined thereby. Returning to the example of a bit map with 24-bit color, such a system would include 8 bits of red, 8 bits of green, and 8 bits of blue. It can be desirable to fade the image awhile keeping the color constant with intensity change.

One system uses an experimental technique to determine how to fade in order to maintain color constant and forms a look-up table between the constant color and the look up table.

Another system directly maps the bits to color by defining the map as chromium using techniques from color television. For example, this takes the bits, and converts the valves indicating image to color or chrominance © and image luminance (Y) of the image. The conversion between RGB and Y/C is well known. The values of Y and C which correspond to the chrominance and luminance are then stored. The gobo can then be dimmed by reducing the Y, keeping C the same. If desired, the Y/C can be converted back to RGB after dimming.

Another system allows reducing the number of bits for a bit map. Say, as an example, that it is desired to use a total of 8 bits to represent each pixel of the image. This could then be apportioned between the desired bits with red having 3 bits, green having 3 bits, and blue having 2 bits. This limits the amount of information in any of these colors. Since there are only 2 bits for blue, there are only four levels of blue that can be selected. This is often insufficient.

In this system, therefore, the bits are compressed by assuming that two adjacent lines have exactly the same values. Hence, each two lines get the same color value (but can have different intensity values). Now in a system as described above, two lines of red can have 5 bits, two lines of green can have 6 bits, and two lines of blue can also have 5 bits. This provides an appropriate dynamic range for color at the expense of losing half the resolution for color.

Moreover, this has an additional advantage in that it allows 5 bits for grey scale in such a system.

A possible problem with such a system, however, as described above, is that the information would not necessarily be aligned on byte boundaries. It could, therefore, be necessary to take the whole image, manipulate it, and then put the whole image back.

Figure 9:
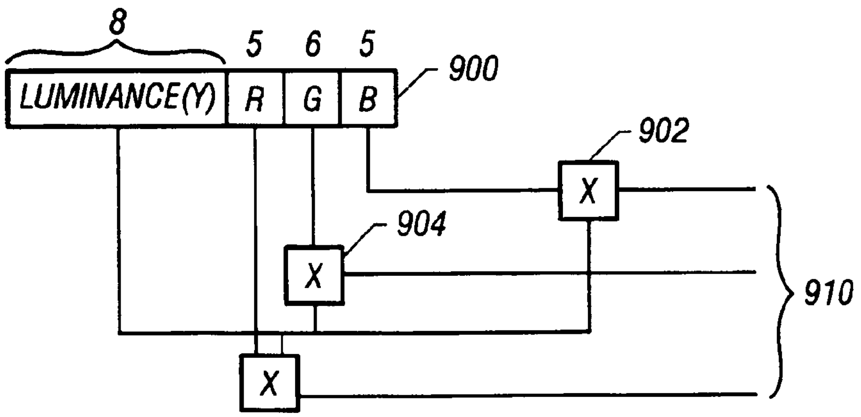
FIG. 9 shows a y/c conversion.

The basic system is shown in FIG. 9. The luminance Y is an 8-bit representation of the brightness level of the image. The hue is then divided into dual-line multiple bits. Each bit is used for two lines each.

Dimming in such a system is carried out as shown in FIG. 9. For example, the blue bits 900 are multiplied in a hardware multiplier 902 by the luminance. Similarly, the green is multiplied in a second hardware multiplier 904 by the same luminance value. This controls the relative levels of red, green, and blue that are output on the RGB lines 910.

The multipliers that are used are very simple, since they simply multiply 8 bits by 3 bits. Therefore, a simple hardware multiplier can be used for this function.

This provides red, green, and blue color without loss of data and with substantially perfect fading.

Figure 10:
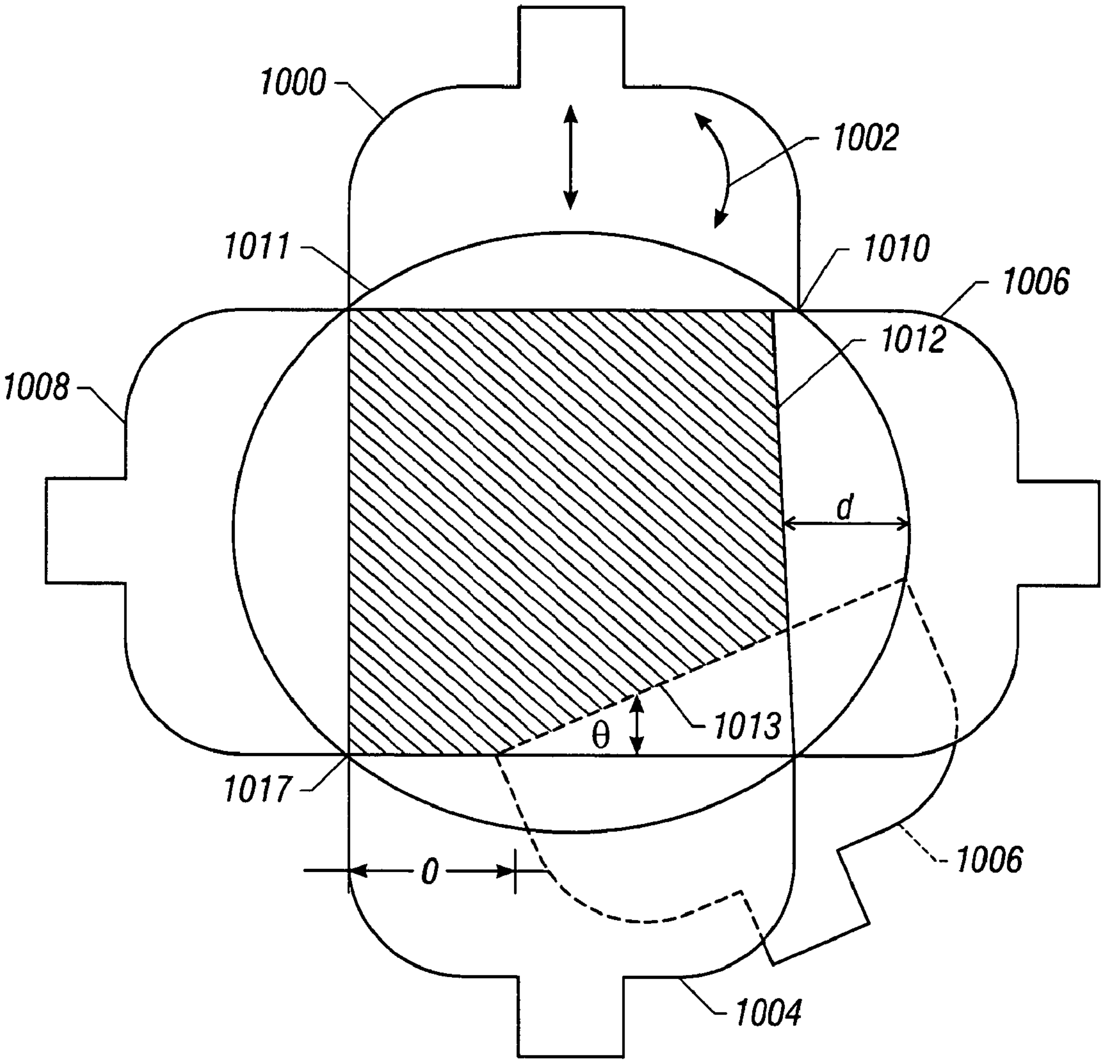
FIG. 10 shows a framing shutter.

An additional feature described herein is a framing shutter gobo. A basic framing shutter is shown in FIG. 10. FIG. 10 shows the circular spot of the beam, and the analog shutter, often called a LECO. Each analog shutter 1000 can be moved in and out in the direction of the arrows shown. Each shutter can also be moved in an angular direction, shown by the arrow 1002. There are a total of four shutters, which, in combination, enable framing the beam to a desired shape. For example, the shutter 1004 can be moved to the position shown in dotted lines as 1006. When this happens, the effective image that is passed becomes as shown in hatched lines in FIG. 10. Another possibility is that the shutter can be tilted to put a notch into the image.

According to this system, another record is formed for a gobo defining a framing shutter. The framing shutter gobo allows control of multiple values including the positions of the four framing shutters 1000, 1004, 1006, and 1008. Each framing shutter is defined in terms of its value d, corresponding to the distance between one edge 1010 of the framing shutter and the edge 1011 of the original spot. In this system, the value d is shown representing the right-hand edge of the framing shutter.

Another selectable value is θ, which defines the angle that the front blade 1013 of the framing shutter makes relative to perfect horizontal or vertical. Yet another parameter which can be selected is offset O which represents the distance between the framing shutter edge 1010 and the ideal edge portion 1017. Other values can alternatively be specified. By controlling all these values, the Medusa shutter can in effect simulate any desired framing shutter gobo.

The video controller and line buffer 1114 can also be formed from the field-programmable gate array.

A number of different special gobos are defined according to the present system. Each of these gobos is defined according to the record format described above.

These include:

Oscilloscope. This enables simulating the output value of an oscilloscope as the gobo. For example, any value that can be displayed on the oscilloscope could be used as a gobo with a finite width. This could include sine waves, square waves, straight waves, sawtooth waves, and the like.

Other variable gobos include vertical lines, moire lines, laser dots, radial lines, concentric circles, geometric spiral, bar code, moon phases, flowers and rotating flowers, a diamond tiling within a shape, kaleidoscope, tunnel vision, and others.

Animated gobos correspond to those which execute codes described above. Some examples of these include, for example, self-animating random clouds; self-animating random reflections; self-animating random flames, fireworks; randomly moving shapes such as honeycombs, crosswords, or undulations; foam; random flying shapes.

Control as a Multi-Layered Image

As described above, the present system allows sophisticated control of electronic images, and manipulation of images. The control of the gobo can be selected as a layered image mode. Each gobo then effectively becomes a multi-part layered image.

Figure 12:
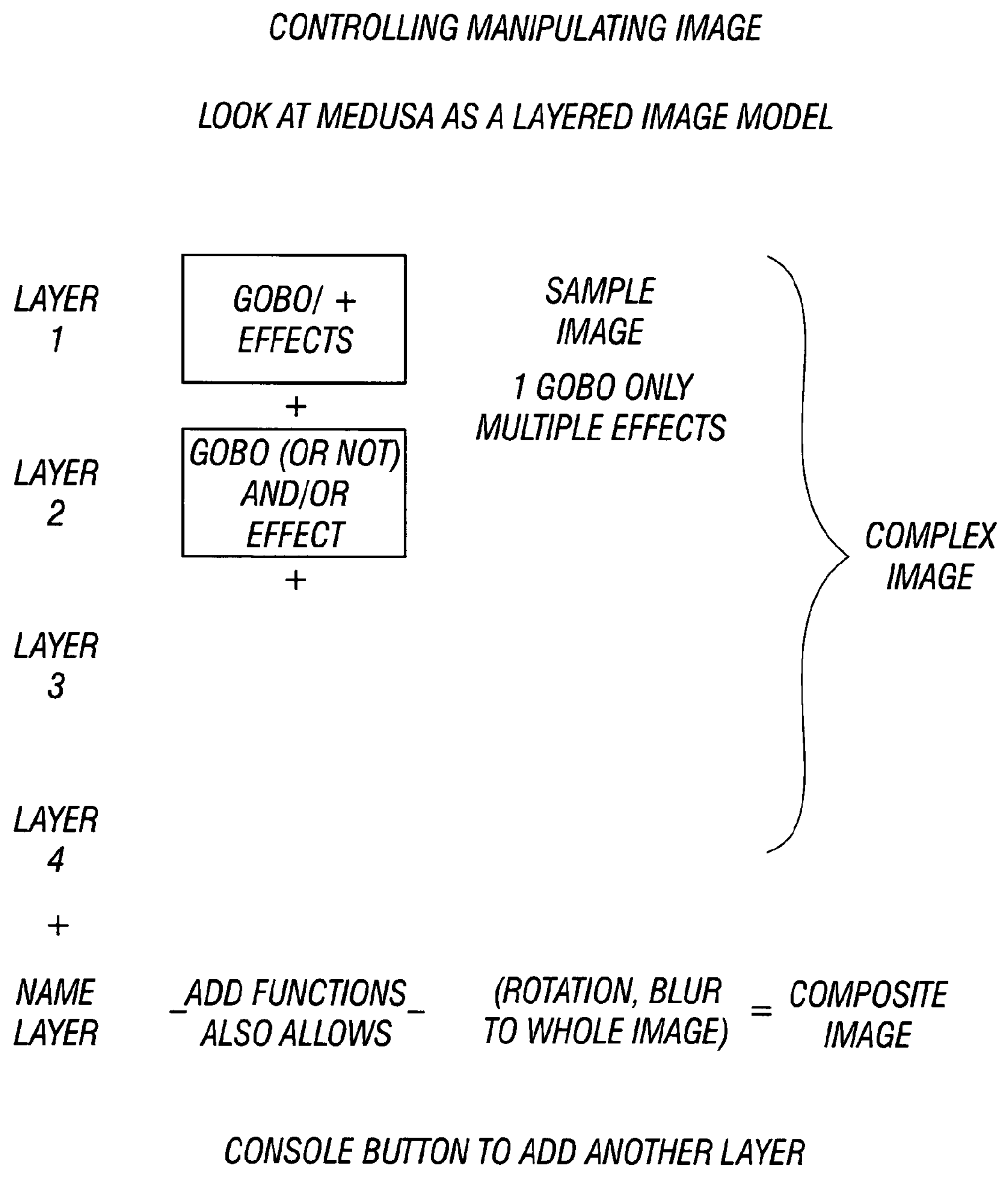
FIG. 12 shows a layout of the layered system.

A layout of the control for the system is shown in FIG. 12.

Layer 1 includes gobos plus effects. This is for a simple image; with one gobo only and multiple effects. The second layer includes additional information. This can include gobos, non gobos, and/or additional effects. Third layers and fourth layers are similarly situated. The multiple layers collectively form a complex image.

Effectively, therefore, a complex image is formed by a number of layers. A first layer has a gobo. Additional functions are defined in the other layers. This forms a composite image. Each layer can be operated on by the other layers. For example, each layer can be individually rotated or blurred, and/or rotation and blur can be applied to the entire image. This enables the console to be controlled incrementally. The gobo image is formed by adding one layer then adding another layer. The multiple layers together effectively become the complex image.

Figure 13:
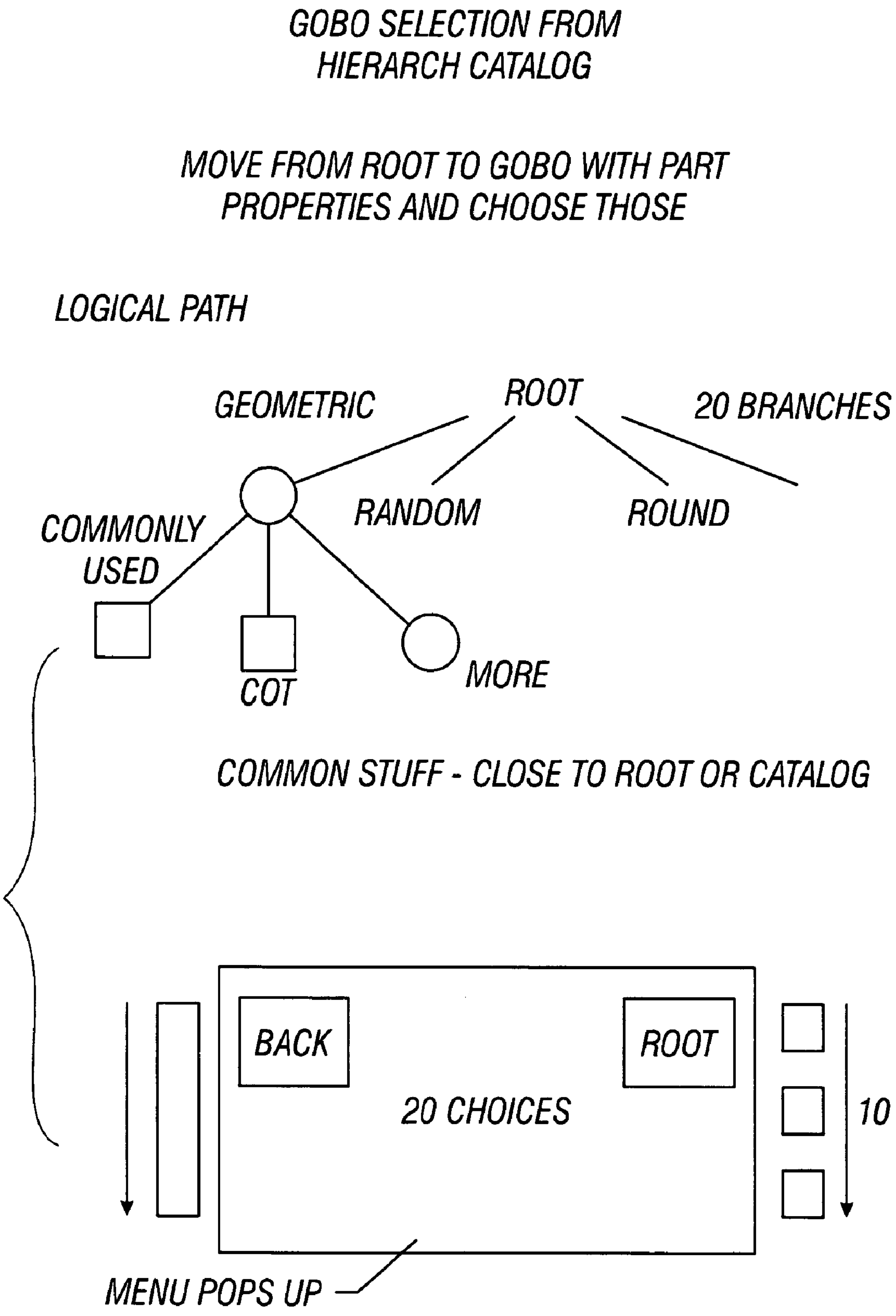
FIG. 13 shows a gobo selection tree.

Gobo selection occurs from a gobo catalog arranged in a tree structure as shown in FIG. 13. Operation follows a logical path within the catalog. A route shown as 1300 begins the operation of selecting from a tree-like operation.

A first branch of the tree includes commonly used gobos. The gobos are also arranged by some aspect of their look, including categories shown as geometric, random, pictures. Within the geometric gobos, the gobos can be arranged by the class of the geometry, shown here as random, round, triangles, and the like. Again within each branch, there can be possibilities. Within the "round" selection is single circle, two circles, three circles, four circles that are close, etc. Each route can have twenty branches.

The menu shown in FIG. 13 pops up each time a category is selected. An important feature keeps the commonly-used parts close to the root of the catalog. This can be done either by selecting those gobos which are most common and putting these in the commonly-used paths or by taking a statistical selection of those gobos which are used. For example, a memory location could store the number of times a gobo is used, and those with for example the sixty highest numbers could be stored in the commonly used paths. Preferably those stored in the commonly used paths are also selectable via their parameters. The gobo catalog arranges the gobos as a tree that is logically connected. Many gobos have multiple characteristics. Those gobos are then categorized based on all of those multiple characteristics, and those gobos can be accessed through any of the paths for any of the categories.

Each of the layers defines an action to be taken on the image that forms a stencil for the light beam projection. The layers are combined two at a time to form a composite image. Then; that composite image is combined with the next layer to form a new composite image, and so on.

The combination can be defined as any of the following:

1) A logical "and" of bits
2) A logical "or" of bits
3) A mathematical addition of the images
4) A multiplication of the images
5) A highest text precedence combination, where the brightest parts of the images are taken.
6) An exclusive or operation.

The layered output model is controlled by names. The following represents the terminology used in this embodiment.

Gobo

The object from the catalog with no associated effects.

Effect

Tools and filters that modify a gobo.

Layer

A layer may have one of the following:

Gobo

Gobo with single or multiple effects

Effect

A combination of a gobo and effects within a layer only modifies effects the gobo within that layer. Four layers of this type can form a Composite Image.

Layers 1-4 store in the gobo palette or directly into cues as "orphans".

Effect Layer

An Effect Layer is a special type of layer that does not contain a gobo. This layer defines and effect and modifies any layers prior to the effects layer.

Component

A single gobo or effect within a layer.

Manual Layer

All functions that simulate motorized lamp operate at this layer. These effect proportionally, or completely, anything that is stored in the image palette. The output of this layer is stored into cues as individual cue records.

Simple and Complex images do not reside on the manual layer.

Image

The combination of layers 1-4, using any of the combination techniques described above.

Simple Image

A one layer image.

Complex Image

An image having more than one layer.

Composite Image

The combination of images with the manual layer.

The image layers described herein facilitate constructing and editing an image as described herein.

The gobo menu is shown in FIG. 13. A paper based gobo catalog exists in a similar form. The gobo menu of FIG. 13 is displayed on the Menu panel. The gobos are organized by type and also categorically.

Each gobo is assigned a catalog number. This number can be used as a quick way to select a gobo. It is possible at any time to enter the numeric catalog number to access a gobo without entering the gobo menu.

Gobos selected from the Menu panel are sent to the selected fixtures and can then be stored into cues or into a palette.

A user-definable portion of the catalog is used for custom images.

Variable/Animation Gobos

A variable gobo is selected from the Menu panel. The appropriate number of unassigned or "wild" encoders automatically load. These encoders obtain control over the variable. A variable gobo can be changed in real time control via the wild encoders.

The effects menu is an additional menu mode that contains a list of all filters or tools used to modify an image. This does NOT include motorized functions.

The effects menu gives the user access to effects that may not be loaded with control on an MPD or a wild encoder.

Auto/Manual Palette Color

Any palette index may be prescribed a key color for organizational purposes.

The layer editor is an expanded palette editor that allows views and control while building a complex image.

This editor may be used or accessed manually, from a palette, or from within an Image Cue Record.

The editor includes copy/paste/delete options within the editor for layer modification.

The Menu panel is used to display layer contents.

The Manual Layer

Most components of the manual layer are controlled from a manual panel driver, Wild Encoder, or Numeric entry. Color, focus, and shutters are selected, on the manual layer from palettes.

Components of the manual layer can store into cues as individual cue records.

Hardware limitations may determine how many effects can be simultaneously processed. Until hardware is tested, a reasonable number of effects may be 12.

Filters

A new filter is added to aid effect management, called "Effect".

Image Records

An Image Record contains all the information for a simple or complex image.

Timing and Delay Defines

Timing on components.

Timing on layers.

Timing on Image Records.

Timing on manual panel drivers.

Targeting Cues and Chases

Targeting

A cue record that adds or changes an effect in layer(s) 1-4 without changing the stored value of the Image.

Verbal Explanation.

Combo Palette

Layer Maps

Layer Palette

Layer Presets

Operating Modes

Shutter

Fade

Although only a few embodiments have been described in detail above, those having ordinary skill in the art certainly understand that modifications are possible.

The invention claimed is:

1. A controller system for a lighting device, comprising:

a user interface that allows separately selecting a first portion of a gobo and a second portion of the gobo; and a gobo production device, which takes a combination of said first and second portions, and defines a gobo from said combination of said first and second portions, wherein said combination is a multiplication of said first portion and said second portion.

2. A controller for a lighting device, comprising:

a user interface that allows selecting portions of gobos that define a lighting effect to be projected, wherein said portions include a first portion that defines a first part of the lighting effect, where said first portion includes a first gobo and at least one effect within the first portion where said at least one effect carries out an effect only on said first gobo within said first portion and said portions also include a second portion that includes a second effect that modifies said first gobo, wherein said controller makes a multiplication between the layers.

3. A controller for a lighting device, comprising:

a user interface that allows selecting portions of gobos that define a lighting effect to be projected, wherein said portions include a first portion that defines a first part of the lighting effect, where said first portion includes a first gobo and at least one effect within the first portion where said at least one effect carries out an effect only on said first gobo within said first portion and said portions also include a second portion that includes a second effect that modifies said first gobo, wherein said controller compares each of a plurality of areas of each of said layers, and for each area of the layers, selects a brightest part of each image as a part that is used for projecting an image.

4. A controller for a lighting device, comprising:

a user interface that allows selecting portions of gobos that define a lighting effect to be projected, wherein said portions include a first portion that defines a first part of the lighting effect, where said first portion includes a first gobo and at least one effect within the first portion where said at least one effect carries out an effect only on said first gobo within said first portion and said portions also include a second portion that includes a second effect that modifies said first gobo, wherein said controller makes an exclusive or operation between said layers.

5. A controller for a lighting device, comprising:

a user interface that controls defining gobos according to different layers which collectively define the gobo, at least the first layer including a gobo, and a second layer including at least one part that modifies said gobo, wherein said user interface allows modifying at least one of said layers, and allows copying from said layers and pasting into said layers.

6. A controller as in claim 5, wherein a first layer includes a first gobo and at least one effect within the first gobo, where said at least one effect carries out an effect only on said first gobo within said first portion and said layers also include a second portion that includes a second effect that modifies said first gobo.

7. A controller as in claim 5, wherein said layers of the image are defined to combine the images according to a specified combination technique.

8. A controller as in claim 5, wherein said controller makes a logical "OR" combination between the layers.

9. A controller as in claim 5, wherein said controller makes a mathematical addition between the layers.

10. A controller as in claim 5, wherein said controller makes a multiplication between the layers.

11. A controller as in claim 5, wherein said controller compares each of a plurality of areas of each of said layers, and for each area of the layers, selects a brightest part of each image as a part that is used for projecting an image.

12. A controller as in claim 5, wherein said controller makes an exclusive or operation between said layers.

13. A controller system for a lighting device, comprising:

a user interface that allows separately selecting a first portion of a gobo and a second portion of the gobo; and a gobo production device, which takes a combination of said first and second portions, where said combination is a combination that is not a logical "and" between said first and second portions, and defines a gobo from said combination of said first and second portions, wherein said combination is a multiplication of said first portion and said second portion.

14. A controller system for a lighting device, comprising:

a user interface that allows separately selecting a first portion of a gobo and a second portion of the gobo; and a gobo production device, which takes a combination of said first and second portions, where said combination is a combination that is not a logical "and" between said first and second portions, and defines a gobo from said combination of said first and second portions, wherein said combination compares each of a plurality of areas of said first portion and said second portion, and for each area of the portions, selects a brightest part of each portion.

15. A controller system for a lighting device, comprising:

a user interface that allows separately selecting a first portion of a gobo and a second portion of the gobo; and a gobo production device, which takes a combination of said first and second portions, where said combination is a combination that is not a logical "and" between said first and second portions, and defines a gobo from said combination of said first and second portions, wherein said combination is an exclusive or operation between said first portion and said second portion.

* * * * *